United States Patent
Li

(10) Patent No.: US 8,750,817 B2
(45) Date of Patent: Jun. 10, 2014

(54) CONTROLLING FILTER BANDWIDTH BASED ON BLOCKING SIGNALS

(75) Inventor: Junsong Li, Austin, TX (US)

(73) Assignee: Silicon Laboratories Inc., Austin, TX (US)

(*) Notice: Subject to any disclaimer, the term of this patent is extended or adjusted under 35 U.S.C. 154(b) by 111 days.

(21) Appl. No.: 13/527,941

(22) Filed: Jun. 20, 2012

(65) Prior Publication Data
US 2013/0260707 A1    Oct. 3, 2013

Related U.S. Application Data

(60) Provisional application No. 61/617,123, filed on Mar. 29, 2012.

(51) Int. Cl.
*H04B 1/10*    (2006.01)

(52) U.S. Cl.
USPC ........................................ 455/296; 455/278.1

(58) Field of Classification Search
USPC ............ 455/222, 223, 278.1, 296, 63.1, 266; 375/278, 346
See application file for complete search history.

(56) References Cited

U.S. PATENT DOCUMENTS

| | | | | |
|---|---|---|---|---|
| 5,809,399 | A * | 9/1998 | Tuutijarvi et al. | 455/63.1 |
| 6,047,171 | A * | 4/2000 | Khayrallah et al. | 455/266 |
| 7,116,958 | B1 * | 10/2006 | Brown et al. | 455/266 |
| 8,078,129 | B2 * | 12/2011 | Lindstrom et al. | 455/266 |
| 8,290,457 | B2 * | 10/2012 | Li | 455/223 |
| 8,433,271 | B2 * | 4/2013 | Li | 455/223 |
| 8,559,574 | B2 * | 10/2013 | Shi et al. | 375/350 |
| 2011/0044414 | A1 | 2/2011 | Li | |

OTHER PUBLICATIONS

Silicon Labs, "Si475x-A10—High Performance Automotive AM/FM Radio Receiver," 2010, 2 pages.

* cited by examiner

*Primary Examiner* — Sonny Trinh
(74) *Attorney, Agent, or Firm* — Egan, Peterman & Enders LLP.

(57) ABSTRACT

In one embodiment, a method includes determining in a controller of a radio receiver whether at least one blocker signal is present in a blocking spectrum surrounding a desired radio channel. If no blocker signal is present, a channel filter of a signal processing path of the radio receiver may be controlled to operate at a first bandwidth. If a first blocker signal is present, the channel filter may be controlled to operate at a second bandwidth less than the first bandwidth. If the first blocker signal and a second blocker signal are present on opposing sides of the desired radio channel, the channel filter may be controlled to operate at a third bandwidth less than the second bandwidth, when a beating signal based on the first and second blocker signals is greater than a threshold level.

27 Claims, 7 Drawing Sheets

US 8,750,817 B2

CONTROLLING FILTER BANDWIDTH BASED ON BLOCKING SIGNALS

This application claims the benefit of U.S. Provisional Application No. 61/617,123, filed on Mar. 29, 2012, in the name of Junsong Li entitled "Controlling Filter Bandwidth Based On Blocking Signals."

BACKGROUND

Many different types of radio receivers are available. Conventionally, receivers were formed of various discrete components and implemented within a desired type of solution such as a desktop radio in the form of a clock radio, an integrated radio within a stereo receiver, a portable receiver such as a handheld receiver, or a mobile receiver such as incorporated in a car stereo.

As technology has advanced, radio receivers have begun to be implemented within semiconductor integrated circuits. In this way, much smaller radio solutions are possible to enable implementation of radios within smaller devices such as MP3 players, cellular telephones such as smart phones and so forth. In addition, semiconductor advances can provide improved audio quality by way of signal processing techniques.

One issue with regard to processing radio signals in such receivers can be the presence of so-called blocking channels, which are channels adjacent to a desired channel, and that can significantly interfere with receipt of the desired channel. Such blockers can cause interference within a radio frequency (RF) signal or a downconverted frequency to which an RF signal is converted.

SUMMARY OF INVENTION

According to one aspect, a system includes an antenna to receive a radio frequency (RF) signal and a radio receiver coupled to the antenna to receive and process the RF signal to output an audio signal. In an embodiment, the radio receiver includes an analog front end to receive the RF signal and downconvert the RF signal to a baseband signal, an analog-to-digital converter (ADC) to convert the baseband signal to a digitized signal, and a digital signal processor (DSP) to receive and demodulate the digitized signal and to provide a digital audio output. The DSP may have a signal processing path including a channel filter with a selectively controllable bandwidth that can be based at least in part on a frequency deviation signal and a beating signal associated with one or more blocker signals. Such blocker signals may be present in a blocking spectrum adjacent to a desired signal channel.

In an embodiment, the receiver may further include a deviation estimator to estimate a peak frequency deviation of a first blocker signal of a first blocking channel. This estimator may include a first decimator to receive and decimate a complex signal, a mixer to downconvert the complex signal to a lower sampling rate, a second demodulator to demodulate the lower sampling rate complex signal into a demodulated signal, a second decimator to decimate the demodulated signal, and a DC circuit to generate a pilot RMS signal, the peak frequency deviation signal, and a frequency offset signal. This estimator may be controlled to be disabled if a blocker signal is not substantially greater than a strength of the desired signal channel.

Still further an embodiment may include a blocker beating detector to generate the beating signal. This detector may include an absolute value circuit to generate an absolute value of a decimated signal, a first path to generate a first path signal, a second path to generate a second path signal, and a beating engine to generate the beating signal based on the first and second path signals. In one embodiment, the first path includes a first filter, a second absolute value circuit, and a second filter coupled to an output of the absolute value circuit to provide the first path signal, and the second path includes a third filter to output a DC signal corresponding to the second path signal.

Another aspect is directed to a method including determining in a controller of a radio receiver whether at least one blocker signal is present in a blocking spectrum surrounding a desired radio channel. If no blocker signal is present, a channel filter of a signal processing path of the radio receiver may be controlled to operate at a first bandwidth. If a first blocker signal is present, the channel filter may be controlled to operate at a second bandwidth less than the first bandwidth. If the first blocker signal and a second blocker signal are present on opposing sides of the desired radio channel, the channel filter may be controlled to operate at a third bandwidth less than the second bandwidth when a beating signal based on the first and second blocker signals is greater than a threshold level. In an embodiment, at least one of the first and second blocker signals can be analyzed in a deviation estimator to estimate a peak frequency deviation of the at least one of the first and second blocker signals.

Yet another aspect is directed to an apparatus that includes a deviation estimator coupled to a signal processing path of a radio receiver to estimate a peak frequency deviation of a first blocker signal of a first blocking channel adjacent to a desired signal channel. This deviation estimator may include a first decimator to receive and decimate a complex signal from the signal processing path, a mixer to downconvert the complex signal to a lower sampling rate, a second demodulator to demodulate the lower sampling rate complex signal into a demodulated signal, a second decimator to decimate the demodulated signal, and a DC circuit to generate a pilot RMS signal, a peak frequency deviation signal, and a frequency offset signal from the demodulated signal.

DETAILED DESCRIPTION

Figure 1:
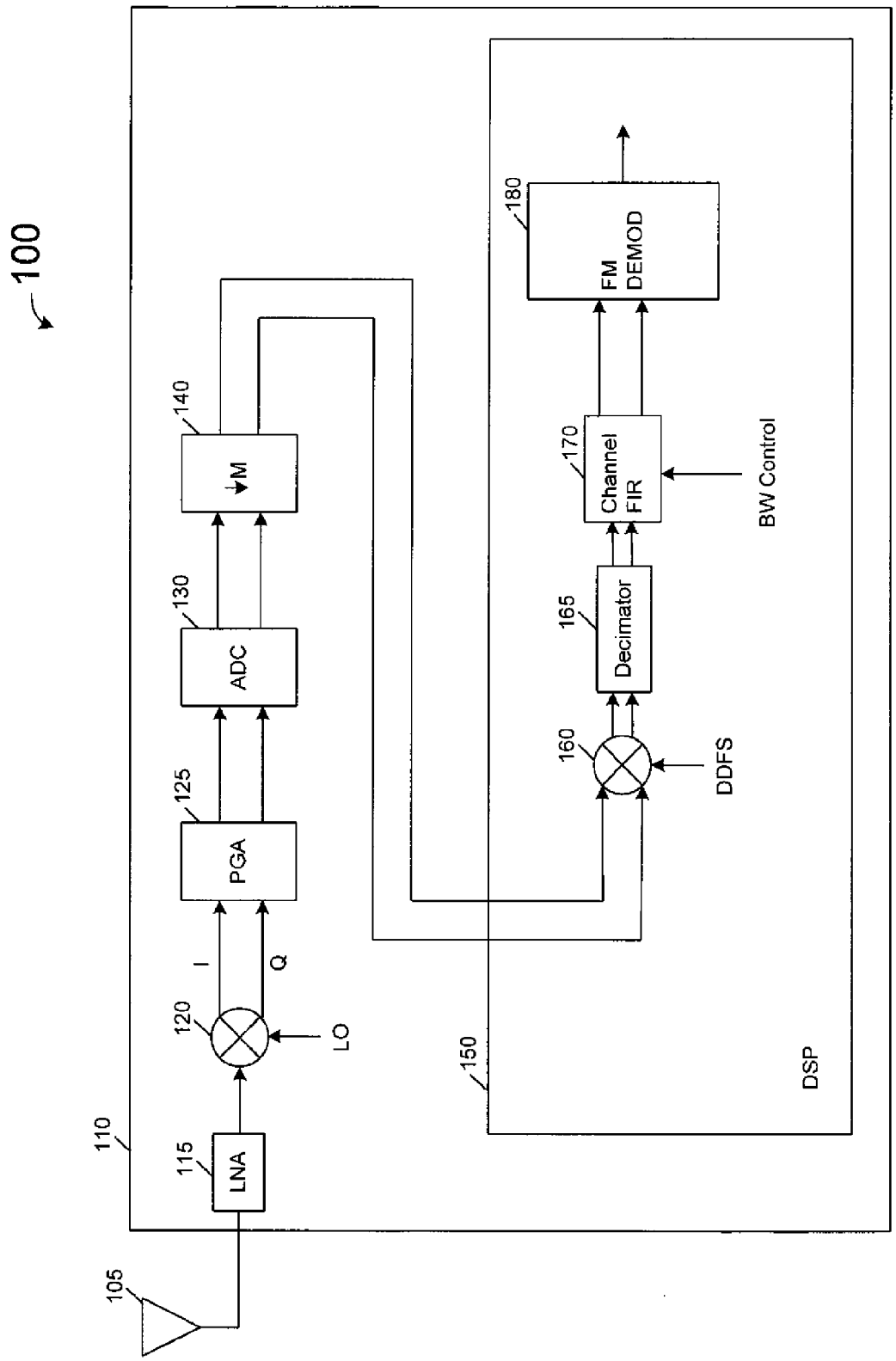
FIG. 1 is a block diagram of a radio receiver in accordance with one embodiment of the present invention.

In various embodiments, certain information can be extracted from blocking channels. Then based on this information, a bandwidth of one or more components of a radio receiver can be dynamically controlled. Referring now to FIG. 1, shown is a block diagram of a portion of a radio receiver in accordance with one embodiment of the present invention. As shown in FIG. 1, receiver 100 may include a single die semiconductor device 110 including both analog and digital circuitry. As an example, a complementary metal oxide semiconductor (CMOS) die can be a mixed-signal device to handle receipt and processing of incoming RF signals. In different implementations, the receiver may be a multi-band receiver such as an amplitude modulation (AM)/frequency modulation (FM)/weatherband (WB) receiver, although the scope of the present invention is not limited in this regard.

As seen in FIG. 1, receiver 100 includes an antenna 105 configured to receive RF signals and provide them to an integrated circuit (IC) 110. In general, IC 110 may include an analog front end, along with a digital signal processor (DSP) 150 to further process downconverted signals. The analog front end including various filtering, mixing, signal processing and analog-to-digital conversion circuitry may be present (although not shown for ease of illustration in FIG. 1) to receive and process an RF signal before providing it to the DSP. In the embodiment shown in FIG. 1, the signal processing path includes a low noise amplifier (LNA) 115 to receive and amplify the incoming RF signals. In turn, these amplified RF signals are provided to a complex mixer 120 to downconvert the signals to a lower frequency such as an intermediate frequency (IF) and generate complex signals, namely in-phase (I) and quadrature (Q) signals. In turn, these signals may be provided to a programmable gain amplifier (PGA) 125 for further amplification before being provided to a converter, namely an analog-to-digital converter (ADC) 130, to be digitized. These digitized signals may have their sampling rate reduced in a decimator 140 which in one embodiment may be configured as a decimator by 25.

These lower sampling rate digitized signals may be provided to DSP 150 that can perform further signal processing as well as demodulation of the signals. Although many processing engines may be included within the DSP, shown for ease of illustration are high level components involved in the processing and demodulation of FM signals. Understand that various other circuitry may be present in DSP to perform processing and demodulation of other signals such as weatherband signals, AM signals and so forth.

In the embodiment of FIG. 1, the DSP signal processing path may receive incoming I and Q signals at a relatively high sampling rate (e.g., at 1.488 Mega samples per second (Ms/s)). These incoming signals may be at an intermediate frequency (IF) and may be provided to DSP 150, which may include mixer 160 which can further downconvert the incoming complex digitized signals to digitized complex baseband signals based on a mixing signal received from a direct digital frequency synthesizer. The downconverted signals can include a signal of a desired channel and one or more blocking signals of blocking channels. In turn, these complex signals may be provided to a decimator 165 which can further reduce the sampling rate, e.g., from 1.488 Ms/s to a rate of 372 kilo samples per second (ks/s) in one embodiment. These reduced sampling rate signals may be provided to a channel filter 170 which in one embodiment can be configured as a finite impulse response (FIR) filter. The resulting filtered signals can be provided to a demodulator 180 to perform demodulation to thus output FM demodulated signals, which can be further processed in additional circuitry of the DSP.

Note that the bandwidth of channel filter 170 can be dynamically controlled in accordance with embodiments of the present invention. In general, this bandwidth control may be implemented based on information determined with regard to blocking signals located near a desired signal channel, and can include various analyses on these blocking signals. Such analyses can include an analysis of their magnitude, location, and relative strength with regard to both the desired signal channel and other blocking signals. Although shown at this high level in the embodiment of FIG. 1, understand the scope of the present invention is not limited in this regard. Also while not shown for ease of illustration, understand that the DSP may be part of a multi-function device including both receive and transmit capabilities. In addition, the receiver may include a storage such as a non-volatile storage including software, firmware, or combinations thereof to enable the DSP or other circuitry to operate in AM/FM/WB modes, and may further enable transmission as well as reception operations.

Thus as will be described further below, in some embodiments control of the bandwidth of channel filter 170 may be based on presence of one or more blocker signals within a blocking spectrum. That is, in many environments, radio channels may be relatively closely adjacent to each other due to the number of radio stations present in a local environment. For example, in the context of the FM band, different radio stations may be located as close as 100 kilohertz (kHz) apart (in many international (non-US) locations). If the strength or energy of an adjacent channel is large enough, it can bleed into the desired signal channel, causing various noise and other signal degradation issues. As used herein, a "blocking spectrum" is a frequency spectrum around a desired signal channel, both on image and signal sides of the channel. In various embodiments, the presence of blocking signals within the blocking spectrum, can be analyzed by various circuitry of the receiver. In addition to determining the presence of these blocking signals, this circuitry may determine approximate energy or strength of the these signals, e.g., via an RSSI analysis.

This information regarding the location and approximate strength of any blocking signals, both on the signal side and image side of a desired channel may be provided to, e.g., a controller which may in turn generate control signals to control the channel filter bandwidth based on the location of blocker signals within the blocking spectrum.

Figure 2:
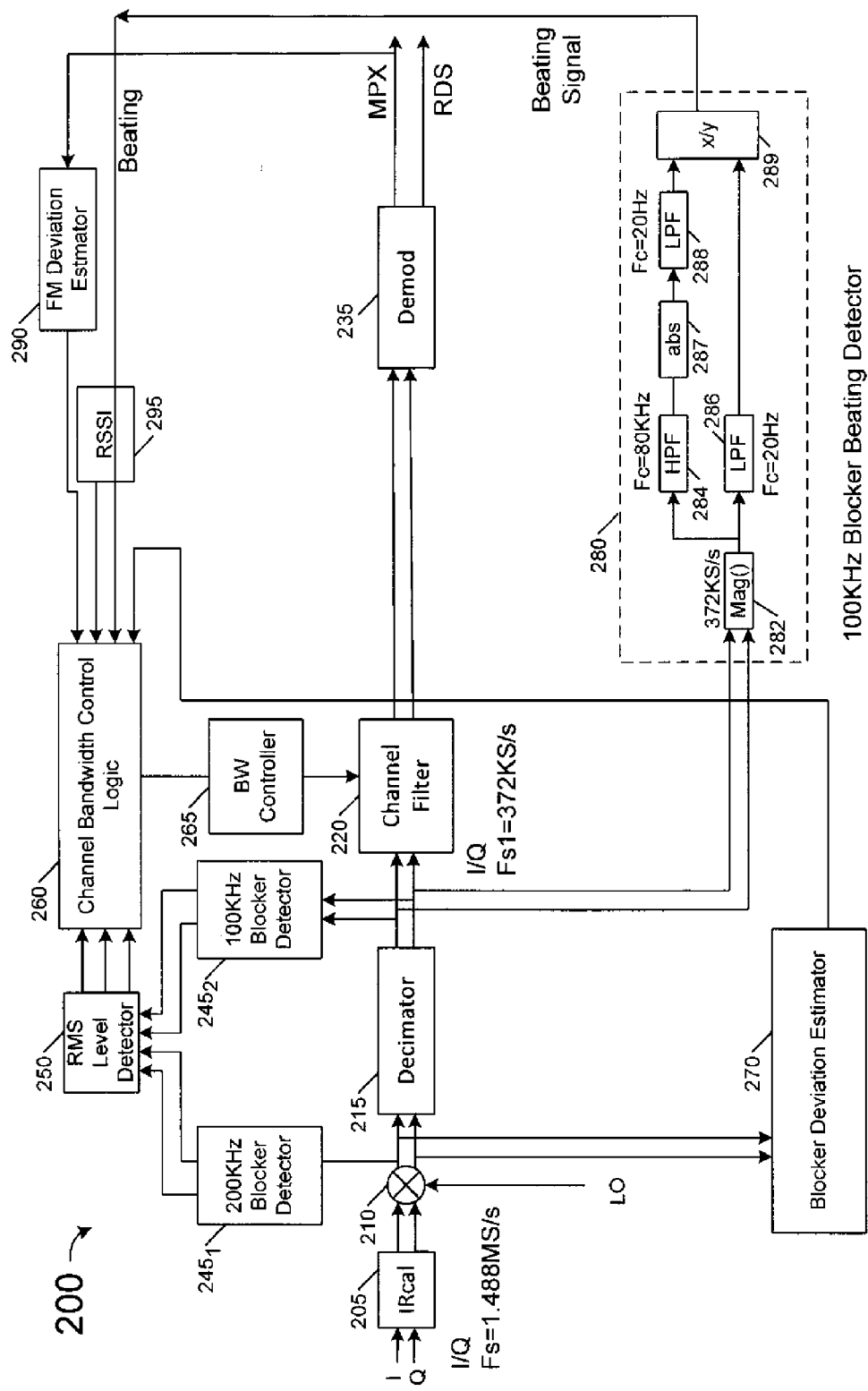
FIG. 2 is a block diagram of a portion of a receiver illustrating various blocking detectors and control in accordance with an embodiment of the present invention.

Referring now to FIG. 2, shown is a block diagram of a portion of a receiver illustrating various blocking detectors and control in accordance with an embodiment of the present invention. As an example, portion 200 may correspond to DSP 150 of FIG. 1, however understand that embodiments of the detection and control circuitry can be implemented in other manners in different embodiments. As seen in FIG. 2, incoming complex signals can be first processed in an image rejection calibration unit 205 which performs image rejection processing to output the signals to a mixer 210. In one embodiment mixer 210 can be implemented to downconvert signals using a mixing signal received from a direct digital frequency synthesizer to thus generate baseband signals which are provided to a decimator 215 which reduces the sampling rate, e.g., to a sampling frequency of 372 kS/s. The resulting signals may be provided to a channel filter 220 which in one embodiment may be implemented as a finite impulse response filter. As will be described further herein, this filter can operate at a controllable bandwidth which can be controlled, e.g., based on an analysis of blocking channels present in the vicinity of a desired channel. The resulting filtered signal can be provided to demodulator 235. The resulting demodulated signals includes a stereo multiplexed signal (MPX) and a radio data system (RDS) signal, which can be provided to additional circuitry of the receiver.

For purposes of discussing the dynamic bandwidth control, note that at a variety of locations in the signal path shown in FIG. 2, the signal can be provided to various detectors that can perform detections in accordance with an embodiment of the present invention with regard to blocking channels along with other estimations.

As seen, a first blocker detector $245_1$ may be present and can receive a portion of the complex signal output from mixer 210 (e.g., in one embodiment the real portion of the signal). Blocker detector circuit $245_1$ may be used to generate a power level detection of a 200 kHz blocker. At this same point in the signal processing path, the complex signal can also be provided to a blocking deviation estimator 270 in accordance with an embodiment of the present invention, details of which will be discussed further below.

Still referring to FIG. 2, after decimation in decimator 215, the lower sample rate signal can be provided to multiple detectors, namely a second blocker detection circuit $245_2$ which in the embodiment can be a 100 kHz blocker detector. In addition, this lower sample rate signal can further be provided to a beating detector circuit 280 which in one embodiment can perform a blocker beating detection for a 100 kHz blocker. As further seen, the demodulated signal at the output of multiplexer 240 may be provided to a further estimator, namely a FM deviation estimator 290.

All of the detection and estimate outputs provided from these various blocks may be provided to a channel bandwidth control logic 260 which, based on these various inputs can determine an appropriate bandwidth for channel filter 220. Accordingly, logic 260 may output control information to a bandwidth controller 265 that in turn can control the bandwidth of channel filter 220.

As further seen, the outputs of detectors $245_1$ and $245_2$ may be provided to an RMS level detector 250, that in turn generates a power level detection to be provided to channel bandwidth control logic 260. And a received signal strength indicator (RSSI) circuit 275 can receive the pre-demodulation FM signal and generate a RSSI waveform. Although shown at this high level in the embodiment of FIG. 2, understand the scope of the present invention is not limited in this regard.

As further seen in FIG. 2, receiver 200 also includes a blocker beating detector 280. In general, detector 280 is configured to generate a beating signal, which can be used as an indication as to whether dual blocking signals are present, namely blocking signals on both sides (positive and negative frequency sides) of a desired channel. In general, detector 280 may be configured to generate a ratio. Based on the magnitude of this ratio it can be determined whether any blocking signals are present and if so, whether the blocking signals are of substantially the same magnitude, or whether one of the blockers is of much greater strength than the other blocking signal.

In general, detector 280 may operate in accordance with the following: $r(t)=S(t)\times e^{j\times(\Theta_s(t))}+Bn(t)\times e^{j\times(\bar{\omega}_c t+\Theta_n(t))}+Bp(t)\times e^{-j\times(\bar{\omega}_c t+\Theta_p(t))}$, where S(t) is the desired signal, Bn(t) is the −100 kHz blocker and Bp(t) is the +100 kHz blocker.

$$|r(t)|^2 = |S(t)|^2 + Bn(t)|^2 + |Bp(t)|^2 + \text{real}[S(t)\times e^{j\times(\Theta_s(t))}\times Bn^*(t)\times e^{-j\times(\bar{\omega}_c t+\Theta_n(t))}] + \text{real}[S(t)\times e^{j\times(\Theta_s(t))}\times Bp^*(t)\times e^{j\times(\bar{\omega}_c t+\Theta_p(t))}] + \text{real}[Bp(t)\times e^{-j\times(\bar{\omega}_c t+\Theta_p(t))}\times Bn^*(t)\times e^{-j\times(\bar{\omega}_c t+\Theta_n(t))}]$$

In the embodiment shown in FIG. 2, detector 280 includes an absolute value engine 282 to generate an absolute value from the incoming decimated signals, received from the output of decimator 215. In one embodiment, a CORDIC arctan can be used for the magnitude calculation. In turn, these magnitude signals may be provided to parallel paths, including a first path and a second path. As seen, the first path includes a low pass filter (LPF) 286. In one embodiment, this low pass filter may be configured with a bandwidth having a center channel frequency of 20 Hertz. This path thus provides a measure of the DC value of the decimated signal that includes a desired signal as well as close-in blockers. LPF 286 thus provides a stable raw power measure of the desired signal and blockers. In turn, the second parallel path includes a high pass filter (HPF) 284 that may in one embodiment have a center frequency of 80 kHz. This high pass filter signal may be provided through an absolute value engine 287 to generate a magnitude that in turn is provided to a LPF 288, which in the embodiment of FIG. 2 may also have a center frequency of 20 Hertz. HPF 284 may, along with absolute value engine 287, act to rectify this high pass filtered signal. In turn, the resulting signals of these two paths may be provided to a ratio generator 289, which may generate a ratio of the second path signal X to the first path signal Y (namely X/Y). This resulting ratio thus corresponds to a beating signal that is provided to channel bandwidth control logic 260. Per this ratio, the beating signal is the strongest when all three signals are at similar level. Although shown with this particular implementation in the embodiment of FIG. 2, understand the scope of the present invention is not limited in this regard.

In general, if there is no interference from blockers, the high frequency component (X) may be very small and thus the resulting ratio of detector 280 is very small (e.g., on the order between approximately 1% and 0.1%). In the presence of blocking signals on both sides of a desired channel, the ratio begins to peak at about 50% when such blockers are present on both sides with roughly the same power. In contrast, when a single blocker is present or one of multiple blockers has a much greater power level, the ratio may be much smaller, e.g., smaller than approximately 1%. Accordingly, based on the beating signal, it can be determined the presence of such dual blockers with similar power levels, if this beating signal is above a given threshold which in one embodiment may be between approximately 18% and 25%.

Note that frequency deviation can occur in the incoming signals, both of the desired signal channel as well as the blocker signals. In general, this frequency deviation may correspond to changes in volume of the signal since as a signal becomes louder, a greater deviation occurs. This is of concern for blocking channels, since when the blocking channel is of a greater deviation, it impinges more into a band of the desired channel. Accordingly, embodiments may perform a blocker frequency deviation estimation. Based on these estimates, the bandwidth for the main the desired signal channel may be controlled accordingly.

Figure 3:
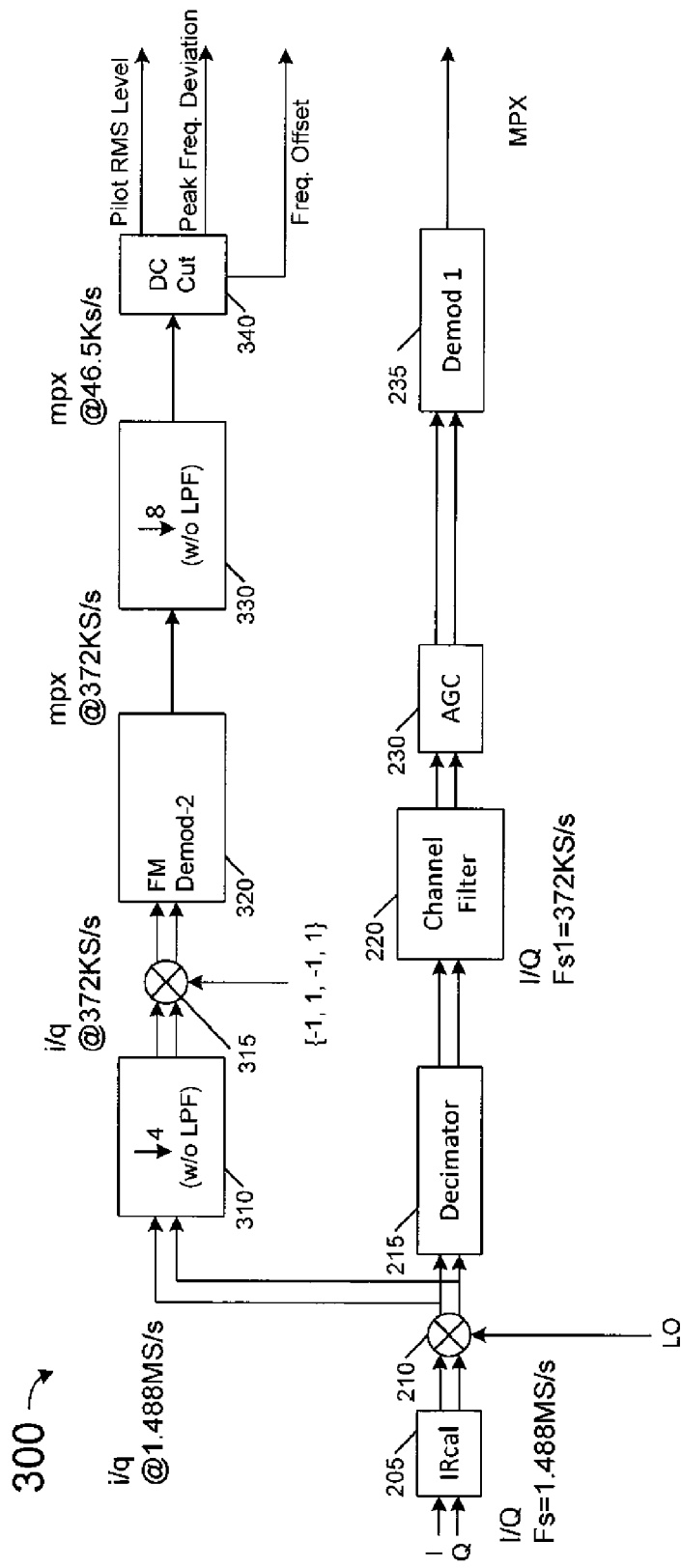
FIG. 3 is a block diagram of a blocker frequency deviation estimator in accordance with an embodiment of the present invention.

Referring now to FIG. 3, shown is a block diagram of a blocker frequency deviation estimator in accordance with an embodiment of the present invention. As shown FIG. 3, a portion of a receiver 300 has a signal processing path such as that of FIG. 2, including image rejection calibration circuit 205, mixer 210, a decimator 215, channel filter 220, and a demodulator 235.

In the embodiment shown, the complex signals output from mixer 210 are provided to a decimator 310. In the embodiment shown, this decimator may reduce the sampling rate of the incoming signals from 1.488 MS/s to a rate of 372 kS/s. Note that this decimator may be without a low pass filter. In turn, decimated signals are provided to a complex mixer 315 that downconverts the 200 KHz blocker signals to baseband and provides them to a demodulator 320, which may generate MPX demodulated signals at a rate of 372 kS/s. In turn, these demodulated signals may be provided to another decimator 330 which may reduce the sampling rate to, e.g., 46.5 kS/s.

In turn, these signals may be provided to a DC cut circuit 340 that outputs various signals which it can generate, including a pilot RMS level signal, a peak frequency deviation signal, a frequency offset signal.

The frequency offset signal may be used to indicate whether the blocker is a 100 kHz or 200 kHz blocker. In turn, the peak frequency deviation may indicate the maximum deviation of the blocking signal, and the pilot RMS signal can indicate the magnitude of the pilot signal itself. Note that in various embodiments, this blocker deviation circuit may be powered off to reduce consumption if it is determined that the blocker channel is not much stronger than the desired signal channel.

Figure 4:
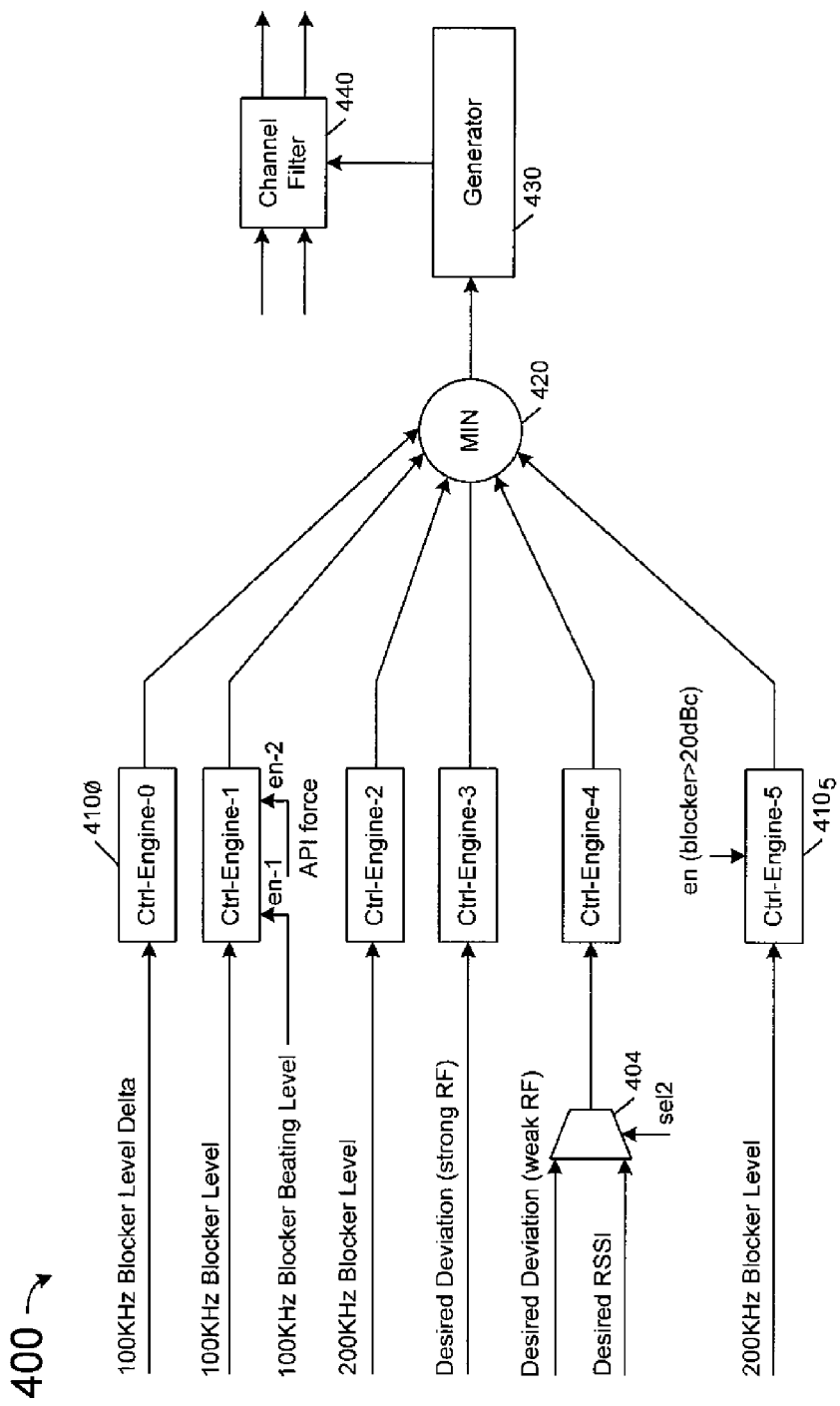
FIG. 4 is a block diagram of a bandwidth control logic in accordance with an embodiment of the present invention.

Referring now to FIG. 4, shown is a block diagram of a bandwidth control logic in accordance with an embodiment of the present invention. As shown in FIG. 4, logic 400 can include a plurality of control engines $410_0$-$410_5$. Although shown with these specific number of control engines in the embodiment of FIG. 4, understand the scope of the present invention is not limited in this regard.

In general, each control engine 410 can be configured to receive incoming information from a given portion of the receiver signal processing path. Based on the received information, the control engine can generate an output signal corresponding to the desired channel bandwidth.

As seen, the resulting output from each of the control engines may be coupled to a minimum operator 420 which may be configured to select the minimum of all of the incoming values and provide it to a FIR generator 430. In an embodiment, the minimum operator may be configured such that if the maximum value of the blockers is greater than a predetermined threshold level (e.g., 10 dBc) filter bandwidth can be forced to be a minimum level, which in one embodiment may be 32 kHz. Generator 430 may operate to generate a bandwidth control signal for channel filter 440 based upon the input to thus control the bandwidth of the channel filter based at least in part on information from the various detectors that provide a variety of information regarding blocking signals, their location and/or strength. Although shown with this specific implementation in the embodiment of FIG. 4, understand the scope of the present invention is not limited in this regard. For example instead of a min function to select from multiple values provided, in other embodiments these values can be packaged together or another type of operation can be performed.

In one embodiment, control engine $410_0$ may be configured in accordance with the pseudocode of Table 1.

TABLE 1

```
en-0
If [max{HASSI_{+100KHz}, LASSI_{-100KHz}}<-15dBc] ||
[max{HASSI_{+100KHz}, LASSI_{-100KHz}}<ASSI200+12dB]
    en-0←0
else
    en-0←1
end
```

As seen, in general control engine $410_0$ may be enabled if the absolute value of the maximum of the 100 kHz blocking signals on either side of a desired signal channel is greater than a threshold value (which in one embodiment may be −15 dBc relative to the desired channel or whether the maximum is less than the 200 kHz blocker level plus a predetermined threshold level.

In one embodiment, control engine $410_1$ may be configured to be enabled if a pre-channel level is greater than a certain threshold (e.g., −80 dBFs), or where a blocker carrier offset is within 100 kHz, a beating signal is greater than a given threshold (which in one embodiment may be −10 dB), and further where the desired signal is a stereo FM signal. If so, this control engine $410_1$ may be enabled, otherwise it is disabled. This is shown pseudocode of Table 2 below.

TABLE 2

```
If (DSP Pre_chann_Level>−80dBFs)  ||
    (blocker_carrier_offset is within 100KHz) &&
    (pre_chan_beating_level > −10dB) &&
    (desired signal is stereo FM)
    en-0←0
else
    en-0←1
end
```

Figure 5:
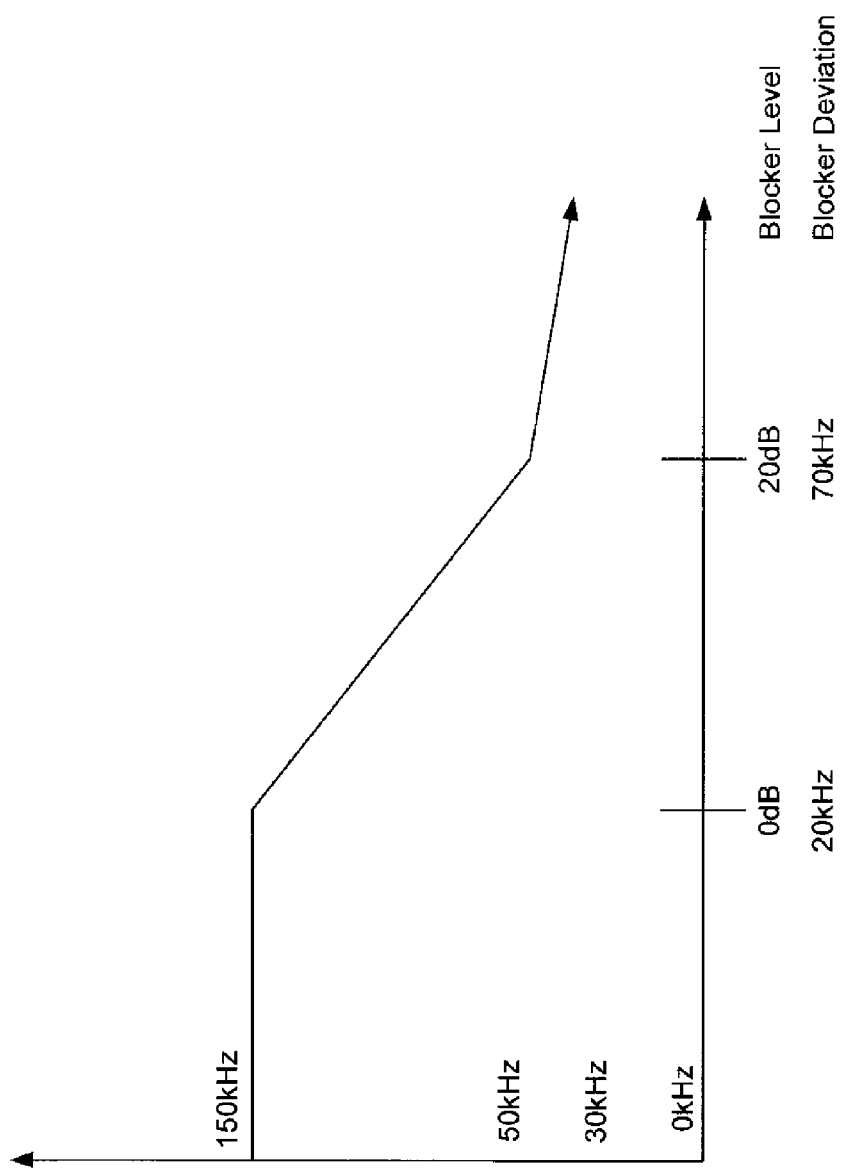
FIG. 5 is a graphical illustration of channel bandwidth control in accordance with an embodiment of the present invention.

Referring now to FIG. 5, shown is a graphical illustration of channel bandwidth control in accordance with an embodiment of the present invention. As shown in FIG. 5, a variable and controllable bandwidth may be provided for a filter of a signal processing path. As seen, when a blocking signal level is relatively low, the channel bandwidth can be relatively large (e.g. on the order of approximately 150 kHz). However, when the blocking signal becomes larger, the channel bandwidth can be reduced to minimize interference from the blocking signal(s). In the embodiment shown, the bandwidth may be maintained at a relatively steady level until a first threshold with regard to the blocking signal is reached (e.g., approximately 0 dB). Then channel bandwidth can be decremented, e.g., linearly, until a next threshold is met (e.g., 20 dB) and then the bandwidth can further decremented, e.g., according to another function, until a minimum bandwidth is reached, which in the embodiment of FIG. 5 is at 32 kHz. FIG. 5 also shows that bandwidth control can be based on a frequency deviation of the blocking signal. Of course in different embodiments control can be based on different combinations (including weightings) of these different blocking signal metrics. And of course, in other embodiments different blocking signal metrics can be used. Although shown with this particular implementation in the embodiment of FIG. 5, understand that various control algorithms and corresponding graphical representations of channel bandwidth relative to blocking signal strength can be present.

Figure 6:
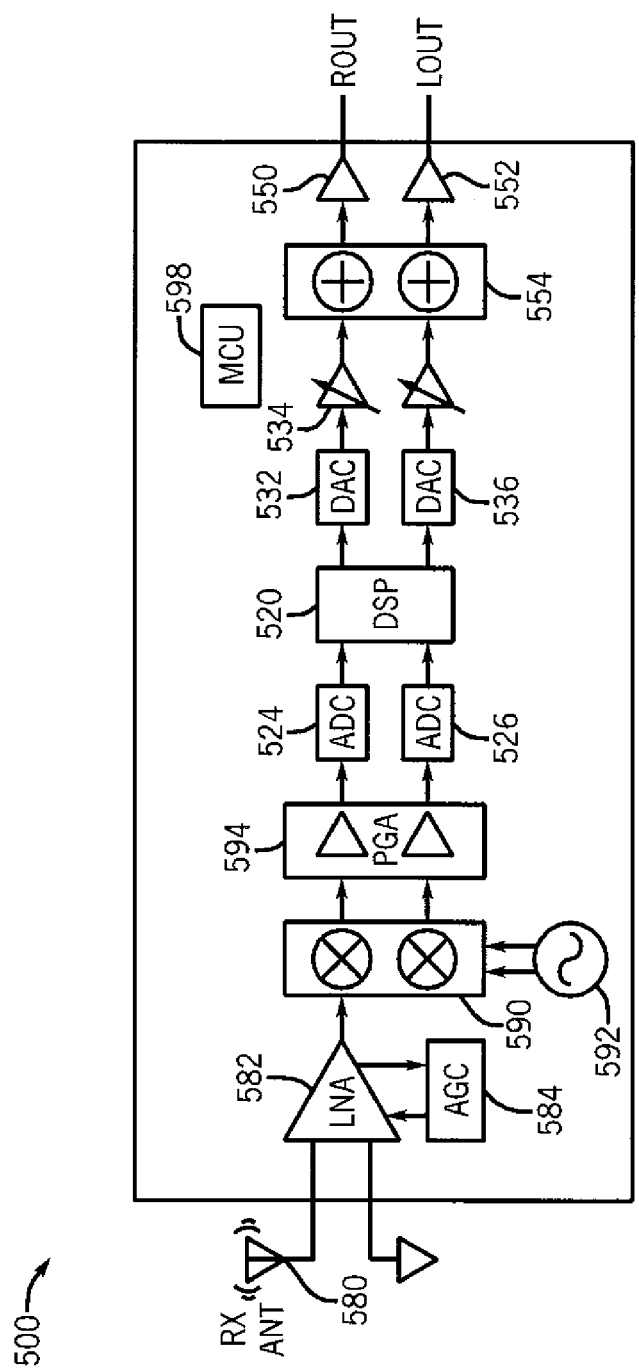
FIG. 6 is a block diagram of a multi-band receiver system in accordance with an embodiment of the present invention.

Embodiments may be implemented in many different receivers, transceivers and so forth. In some implementations, a radio receiver capable of both AM and FM receive modes, among others, may implement embodiments of the present invention. Referring now to FIG. 6, shown is a block diagram of a multi-band receiver system 500 in accordance with an embodiment of the present invention. In one embodiment, system 500 may be a mobile radio such as a car radio. As shown in FIG. 6, a multimode combined AM/FM/WB receiver 500 may be fabricated on a monolithic semiconductor die.

An incoming RF signal is received from an external receive antenna 580 through a LNA 582 controlled by an automatic gain control (AGC) circuit 584. After processing, left channel (called "LOUT") and right channel (called "ROUT") analog stereo signals appear at output terminals 552 and 550, respectively.

The multimode receiver 500 includes analog mixers 590 that are coupled to a tunable local oscillator 592, the frequency of which selects the desired radio channel to which the receiver 500 is tuned. In response to the incoming RF signal, the mixers 590 produce corresponding analog IF, quadrature signals that pass through PGAs 594 before being routed to the ADCs 524 and 526. Thus, the ADCs 524 and 526 convert the analog IF quadrature signals from the PGAs 594 into digital signals, which are provided to a DSP 520.

The DSP 520 demodulates the received complex signals and processes them as described above to provide corresponding digital left and right channel stereo signals at its output terminals; and these digital stereo signals are converted into analog counterparts by DACs 532 and 536, respectively, which are coupled to programmable gain amplifiers 534. In addition, DSP 520 may include circuitry to analyze a blocking spectrum and control bandwidth of a channel filter, as described above. To this end, DSP 520 may execute instructions stored in a non-transitory storage medium to perform such bandwidth control, in some embodiments. A microcontroller unit (MCU) 598 may perform control operations for setting a mode of operation and control of controllable features of the receiver.

Figure 7:
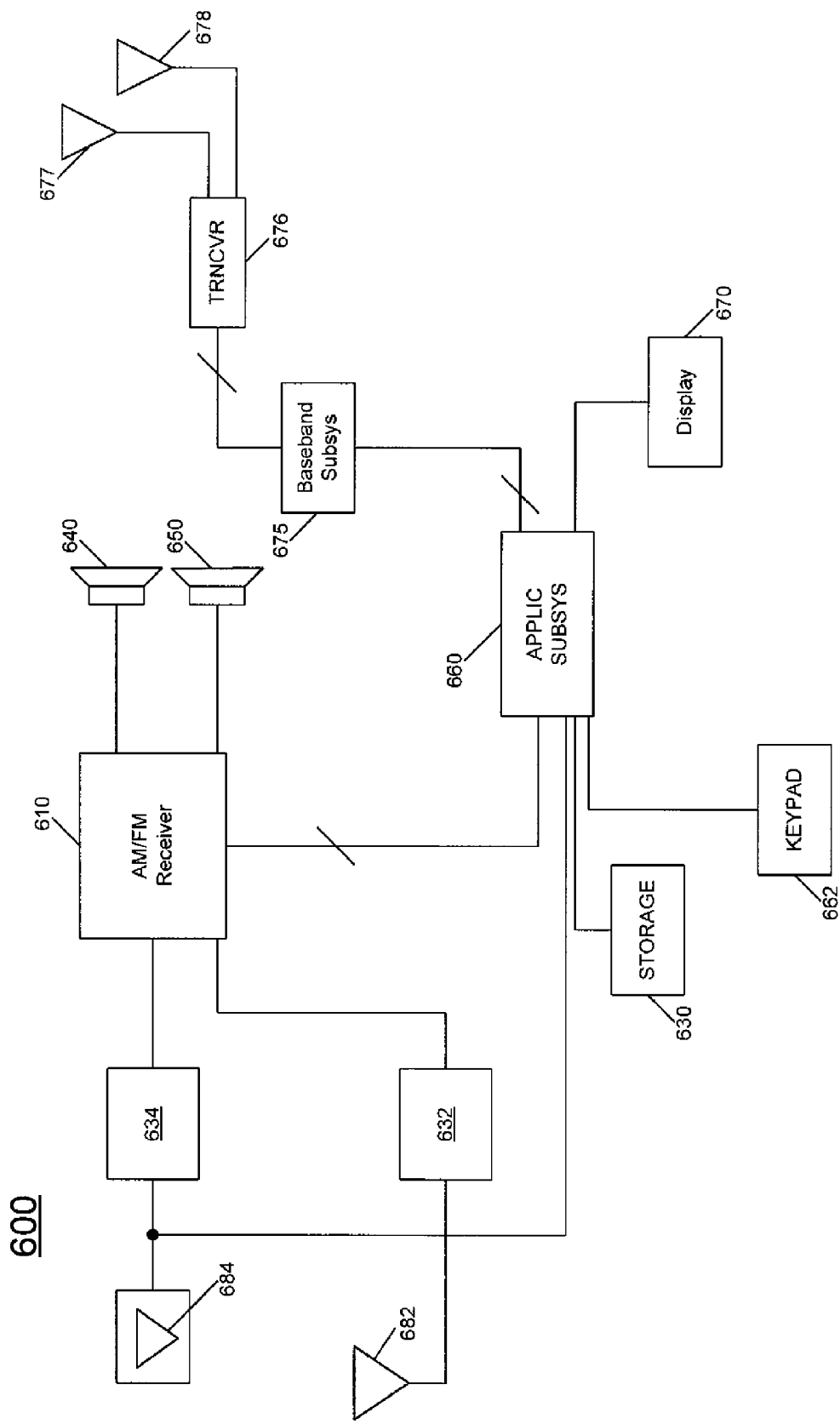
FIG. 7 is a block diagram of a system in accordance with one embodiment of the present invention.

Referring to FIG. 7, in accordance with some embodiments of the invention, an AM/FM receiver 610 (such as an implementation of that shown in the embodiment of FIG. 6) may be part of a multimedia device 600. As examples, the device 600 may be an automobile entertainment system, a portable wireless device such as a dedicated MP3 player, a cellular telephone or PDA with audio capabilities, or other such devices.

Among its other functions, the device 600 may store digital content on a storage 630, which may be a flash memory, hard disk drive, or an external device such as a portable media player, as a few examples. The device 600 generally includes an application subsystem 660 that may, for example, receive input from a keypad 662 of the device 600 and display information on a display 670. Furthermore, the application subsystem 660 may generally control the retrieval and storage of content from the storage 630 and the communication of, e.g., audio with the AM/FM receiver 610. As shown, AM/FM receiver 610 may be directly connected to speakers 640 and 650 for output of audio data. As depicted in FIG. 7, the AM/FM receiver 610 may be coupled by a matching network 632 to an FM receiver antenna 682 and may be coupled by a matching network 634 to an AM receiver antenna 684, which can be tunable or programmable, e.g., via application subsystem 660 that provides control information to control matching network 634.

In accordance with some embodiments of the invention, device 600 may also have the ability to communicate over a communications network, such as a cellular network. For these embodiments, the device 600 may include a baseband subsystem 675 that is coupled to the application subsystem 660 for purposes of encoding and decoding baseband signals for this wireless network. Baseband subsystem 675 may be coupled to a transceiver 676 that is connected to corresponding transmit and receive antennas 677 and 678.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
    a radio receiver to receive and process a radio frequency (RF) signal to output an audio signal, the radio receiver including:
        an analog front end to receive the RF signal and downconvert the RF signal to a second frequency signal,
        an analog-to-digital converter (ADC) to convert the second frequency signal to a digitized signal, and
        a digital signal processor (DSP) to receive and demodulate the digitized signal and to provide a digital audio output, the DSP having a signal processing path including a channel filter having a bandwidth to be selectively controlled based at least in part on a frequency deviation signal and a beating signal associated with one or more blocker signals in a blocking spectrum adjacent to a desired signal channel; and
    a deviation estimator to estimate a peak frequency deviation of a first blocker signal of a first blocking channel adjacent to the desired signal channel.

2. The system of claim 1, wherein the deviation estimator includes:
    a first decimator to receive and decimate a complex signal;
    a mixer to downconvert the complex signal to a lower sampling rate;
    a second demodulator to demodulate the lower sampling rate complex signal into a demodulated signal, the second demodulator separate from a first demodulator that demodulates the digitized signal;
    a second decimator to decimate the demodulated signal; and
    a DC circuit to generate a pilot RMS signal, the peak frequency deviation signal, and a frequency offset signal.

3. The system of claim 2, wherein the deviation estimator is to be disabled if a blocker signal is not substantially greater than a strength of the desired signal channel.

4. The system of claim 1, further comprising-an antenna to receive the RF signal, the radio receiver being coupled to the antenna to receive the RF signal from the antenna.

5. A system comprising:
    a radio receiver to receive and process a radio frequency (RF) signal to output an audio signal, the radio receiver including:
        an analog front end to receive the RF signal and downconvert the RF signal to a second frequency signal,
        an analog-to-digital converter (ADC) to convert the second frequency signal to a digitized signal, and
        a digital signal processor (DSP) to receive and demodulate the digitized signal and to provide a digital audio output, the DSP having a signal processing path including a channel filter having a bandwidth to be selectively controlled based at least in part on a frequency deviation signal and a beating signal associated with one or more blocker signals in a blocking spectrum adjacent to a desired signal channel; and
    a blocker beating detector to generate the beating signal.

6. The system of claim 5, wherein the blocker beating detector includes:
    an absolute value circuit to generate an absolute value of a decimated signal;
    a first path to generate a first path signal;
    a second path to generate a second path signal; and
    a beating engine to generate the beating signal based on the first and second path signals.

7. The system of claim 6, wherein the first path includes a first filter, a second absolute value circuit, and a second filter coupled to an output of the absolute value circuit to provide the first path signal.

8. The system of claim 7, wherein the second path includes a third filter to output a DC signal corresponding to the second path signal.

9. The system of claim 8, wherein the beating engine is to generate the beating signal as a ratio of the first path signal to the second path signal.

10. The system of claim 5, further comprising-an antenna to receive the RF signal, the radio receiver being coupled to the antenna to receive the RF signal from the antenna.

11. A system comprising:
a radio receiver to receive and process a radio frequency (RF) signal to output an audio signal, the radio receiver including:
an analog front end to receive the RF signal and down-convert the RF signal to a second frequency signal,
an analog-to-digital converter (ADC) to convert the second frequency signal to a digitized signal, and
a digital signal processor (DSP) to receive and demodulate the digitized signal and to provide a digital audio output, the DSP having a signal processing path including a channel filter having a bandwidth to be selectively controlled based at least in part on a frequency deviation signal and a beating signal associated with one or more blocker signals in a blocking spectrum adjacent to a desired signal channel; and
a channel bandwidth controller to receive the beating signal and the frequency deviation signal and to dynamically control the filter bandwidth based thereon.

12. The system of claim 11, wherein the channel bandwidth controller includes a plurality of control engines including:
a first control engine to output a difference between a first blocker signal on a first side of the desired signal channel and a second blocker signal on a second side of the desired signal channel if a maximum of the first and second blocker signals is above a threshold value; and
a second control engine to output a maximum of the first and second blocker signals based at least in part on a level of the beating signal.

13. The system of claim 12, wherein the channel bandwidth controller further includes a master controller to receive the output of the first and second control engines and to generate a bandwidth control signal based on one of the output of the first and second control engines.

14. The system of claim 11, further comprising-an antenna to receive the RF signal, the radio receiver being coupled to the antenna to receive the RF signal from the antenna.

15. A method comprising:
determining in a controller of a radio receiver whether at least one blocker signal is present in a blocking spectrum surrounding a desired radio channel;
if no blocker signal is present, controlling a channel filter of a signal processing path of the radio receiver to operate at a first bandwidth;
if a first blocker signal is present, controlling the channel filter to operate at a second bandwidth less than the first bandwidth; and
if the first blocker signal and a second blocker signal are present on opposing sides of the desired radio channel, controlling the channel filter to operate at a third bandwidth less than the second bandwidth when a beating signal based on the first and second blocker signals is greater than a threshold level.

16. The method of claim 15, further comprising analyzing, in a deviation estimator, at least one of the first and second blocker signals to estimate a peak frequency deviation of the at least one of the first and second blocker signals.

17. The method of claim 16, further comprising disabling the deviation estimator if the first and second blocker signals are not substantially greater than the desired signal channel.

18. The method of claim 16, further comprising receiving and processing each of the beating signal, a pilot RMS signal, the peak frequency deviation estimate, a frequency offset signal, and blocker detection signals from a plurality of blocker detector circuits, in a corresponding one of a plurality of control engines of a controller.

19. The method of claim 18, further comprising selecting one output from an output of each of the plurality of control engines, and controlling the bandwidth of the channel filter based thereon.

20. The method of claim 15, further comprising generating a first path signal from a signal obtained from the signal processing path by first filtering, second rectifying, and third filtering the signal.

21. The method of claim 20, further comprising generating a second path signal from the signal obtained from the signal processing path by filtering the signal.

22. The method of claim 21, further comprising generating the beating signal using the first and second path signals.

23. An apparatus comprising:
a deviation estimator coupled to a signal processing path of a radio receiver to estimate a peak frequency deviation of a first blocker signal of a first blocking channel adjacent to a desired signal channel, the deviation estimator including:
a first decimator to receive and decimate a complex signal from the signal processing path;
a mixer to downconvert the complex signal to a lower sampling rate;
a second demodulator to demodulate the lower sampling rate complex signal into a demodulated signal, the second demodulator separate from a first demodulator that demodulates the desired signal channel;
a second decimator to decimate the demodulated signal; and
a DC circuit to generate a pilot RMS signal, a peak frequency deviation signal, and a frequency offset signal from the demodulated signal.

24. The apparatus of claim 23, wherein the deviation estimator is to be disabled if a blocker signal is not substantially greater than a strength of the desired signal channel.

25. The apparatus of claim 23, further comprising a blocker beating detector to generate a beating signal, wherein the blocker beating detector includes:
an absolute value circuit to generate an absolute value of a second complex signal from the signal processing path;
a first path to generate a first path signal;
a second path to generate a second path signal; and
a beating engine to generate the beating signal based on the first and second path signals.

26. The apparatus of claim 25, wherein the first path includes a first filter, a second absolute value circuit, and a second filter coupled to an output of the absolute value circuit to provide the first path signal.

27. The apparatus of claim 26, wherein the second path includes a third filter to output a DC signal corresponding to the second path signal.

* * * * *